United States Patent [19]
Vogler

[11] Patent Number: 5,774,625
[45] Date of Patent: Jun. 30, 1998

[54] ARRANGEMENT FOR MONITORING THE ROTATIONAL SPEED OF A ROTARY-ANODE DRIVE MOTOR OF X-RAY

[75] Inventor: Gerd Vogler, Minden, Germany

[73] Assignee: U.S. Philips Corporation, New York, N.Y.

[21] Appl. No.: 571,505

[22] Filed: Dec. 13, 1995

[30] Foreign Application Priority Data

Dec. 14, 1994 [DE] Germany .......................... 44 44 361.7

[51] Int. Cl.$^6$ ...................................................... H05G 1/34
[52] U.S. Cl. ........................... 388/812; 388/814; 378/94; 378/112; 378/131; 318/458; 318/809
[58] Field of Search ...................... 378/131, 94, 109–112, 378/132; 322/28, 47, 4, 8; 318/798, 800, 802, 803, 799, 805, 812, 807, 808, 804, 458; 388/812, 820, 813, 814

[56] References Cited

U.S. PATENT DOCUMENTS 4,355,276  10/1982  Vittay .......................................... 322/4
5,010,287  4/1991  Mukai et al. ............................ 318/801
5,140,246  8/1992  Rarick ...................................... 318/794
5,212,437  5/1993  Hescht et al. ............................ 318/798

FOREIGN PATENT DOCUMENTS 90068602  4/1990  Germany .

Primary Examiner—John W. Cabeca
Attorney, Agent, or Firm—Jack D. Slobod

[57] ABSTRACT

The invention relates to an X-ray apparatus, comprising a rotary-anode X-ray tube, a device for monitoring the rotational speed of a rotary-anode drive motor of the X-ray tube, a sensor circuit for determining an angle signal which is dependent on the phase angle between a reference voltage and a current associated with the motor, a comparator circuit for detecting the angle signal variation which serves as a criterion for the rotational speed of the motor, and also comprising a frequency changer. Thanks to the fact that there is provided a device for forming a brief keying signal so as to trigger a reduction of the frequency of the rotary-anode drive motor, the device is also suitable for induction motors in which only a small phase angle variation is measured between standstill and the operating rotational speed.

20 Claims, 3 Drawing Sheets

ARRANGEMENT FOR MONITORING THE ROTATIONAL SPEED OF A ROTARY-ANODE DRIVE MOTOR OF X-RAY

BACKGROUND OF THE INVENTION

1. Field of the Invention

The invention relates to an X-ray apparatus, comprising a rotary-anode X-ray tube, a device for monitoring the rotational speed of a rotary anode drive motor of the X-ray tube, a sensor circuit for determining an angle signal which is dependent on the phase angle between a reference voltage and a current associated with the motor, a comparator circuit for detecting the angle signal variation which serves as a criterion for the rotational speed of the motor, and also comprising a frequency changer.

In an arrangement of this kind which is disclosed in DE-U-90 06 860 a signal which is dependent on the rotational speed is acquired by comparing a signal which is dependent on the phase angle of a motor current with a fixed reference value.

2. Description of the Related Art

In induction motors with a small armature reaction (for example in the case of a large air gap or a low power), the phase angle of a motor current changes only slightly from standstill till the operating rotational speed. Because it is also necessary to take into account tolerance fluctuations of the motor data and the monitoring circuit, only a very small angular difference can be used as a criterion for determining whether or not a motor rotates.

The circuit elements of a monitoring circuit must then be very accurate and/or be adjusted for a respective induction motor. The costs are then very high. For motors having a particularly small armature reaction, the known circuit arrangement cannot be used because of the small phase angle variation. This is the case, for example in rotary-anode drive motors of X-ray tubes in which a large isolating gap is required between the stator and the rotor in order to isolate the high voltage present between these motor components.

SUMMARY OF THE INVENTION

It is an object of the invention to construct an arrangement of the kind set forth in such a manner that it is also suitable for induction motors in which only a small phase angle variation is measured between standstill and the operating rotational speed. Using the same monitoring devices, it should even be possible to monitor different types of motors in a reliable manner, without substantial adaptation steps being required, not even if one of the motors is powered via an isolating transformer.

In an arrangement of the kind set forth this object is achieved in that there is provided a device for forming a brief keying signal for triggering a reduction of the frequency of the rotary-anode drive motor.

In response to the reduction of the frequency to the keying frequency, the rotary-anode drive motor rotates, if appropriately stared, at a hypersynchronous speed in the generator range in relation to the keying frequency. A substantially larger variation of the current phase angle then occurs between standstill and the rotational speed in the generator range.

In a preferred embodiment there are provided means for storing the angle signal determined at the operating frequency prior to the beginning of the keying signal, as well as means for comparing said angle signal with an angle signal determined at the keying frequency during the keying period. A specific monitoring device can then be used for motors of different type and power, without requiring essential adaptation steps, even in the case of substantially deviating operating frequencies. This advantage over the known method, is achieved in that the reference value is no longer a fixed value but a variable value which is determined by the relevant motor.

Sufficiently large variations of the phase angle occur when the keying frequency amounts to from 25% to 75% of the operating frequency. Values of from 40% to 60% are to be preferred.

In a further embodiment the phase position of the reference voltage is chosen so that the angle signal which can be measured at the operating frequency and at the operating rotational speed corresponds to an angle of from 25° to 80°, notably from 40° to 60°. Large variations of the phase angle can then also be detected without a change of sign of the angle to be detected. Particularly large phase angle variations of more than ±30° can occur upon interruption of leads leading to the motor.

The device in accordance with the invention enables testing as to whether or not the motor has started by means of only a single measuring operation which, generally speaking, lasts only from 0.1 to 0.2 seconds.

Because the keying periods are very short, however, it is alternatively possible to perform measuring operations at regular intervals. Continuous monitoring can thus be performed, without the rotational speed of the motor being noticeably reduced by the very short measuring operations.

Preferably, means are provided for inhibiting the activation of the X-ray tube when the detected rotational speed of the motor is too low.

The object of the invention is also achieved in that there is provided an X-ray generator, comprising a device for monitoring the rotational speed of a rotary-anode drive motor, a sensor circuit for determining an angle signal which is dependent on the phase angle between a reference voltage and a current associated with the motor, a comparator circuit for detecting the angle signal variation which serves as a criterion for the rotational speed of the motor and also comprises a static frequency changer, characterized in that there is provided a device for forming a brief keying signal for triggering a reduction of the frequency of the rotary-anode drive motor.

These and other aspects of the invention will be apparent from and elucidated with reference to the embodiments described hereinafter.

Figure 1:
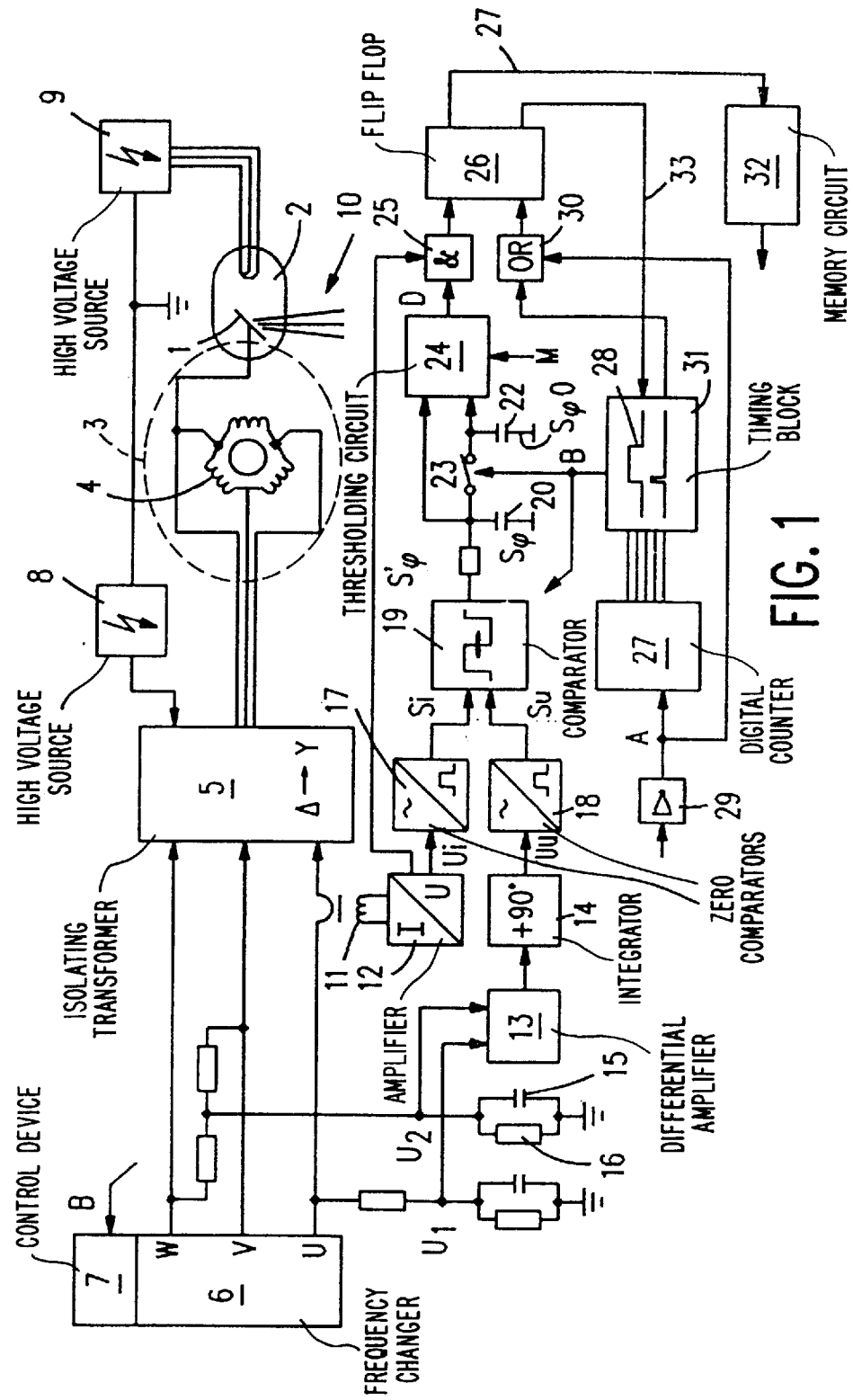
FIG. 1 shows a circuit diagram illustrating the principle of a preferred device in accordance with the invention for monitoring the operational speed of a rotary-anode drive motor of an X-ray tube.

A rotary-anode 1 of an X-ray tube 2 is driven by a tree-phase induction motor 3 whose delta-connected windings 4 are connected to the terminals U, V, W of a frequency changer 6, via an isolating transformer 5. The output frequency of the frequency changer 6 can be adjusted by means of a control device 7. The high-voltage sources 8 and 9 are activated to produce the X-rays 10 after the induction motor has reached its operational speed. A lead from the high-voltage source 8 is also connected, within the isolating transformer 5, to a motor lead which also leads to the anode 1.

The lower part of FIG. 1 represents a general circuit diagram of a device for monitoring the rotational speed of the motor 3. A voltage Ui which is proportional to the current I in the lead from U is derived via the current transformer 11 and the amplifier 12. A suitable reference voltage Uu, having a constant phase position, is formed by means of resistor combinations, using a differential amplifier 13 and an integrator 14 which realizes a 90° phase shift.

The resistor combinations and the selected tappings of the terminals U, V and W ensure, in conjunction with the integrator 14, that the phase angle difference between Ui and Uu is sufficiently large, so that even large positive and negative phase angle variations do not cause reversal of the sign of the phase angle difference. In the case of nominal operation of the motor 3, a phase angle difference of approximately 40° occurs in the present embodiment.

Capacitors 15 serve to smooth the voltage, because the output voltage of the frequency changer 6 is produced by pulse width modulation and hence contains harmonics.

Figure 2A:
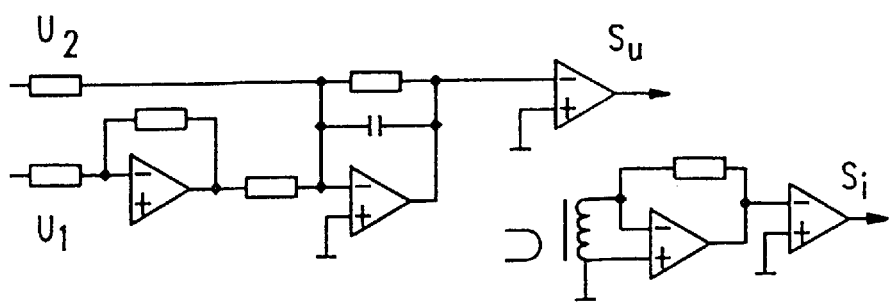
FIGS. 2a, 2b, 3a, 3b, 4a and 4b show details of the monitoring circuit of FIG. 1 and associated signal waveforms.
Figure 2B:
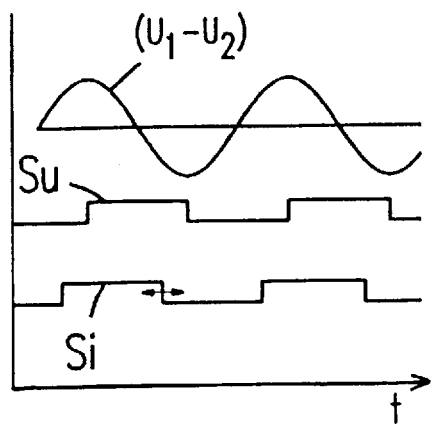

The voltages Ui and Uu are digitized by a respective zero comparator 17, 18 and converted into square-wave signals Si and Su which have been phase shifted in conformity with the phase angle difference between Ui and Uu and whose waveforms are shown in FIG. 2b.

FIGS. 2a and 2c show particularly simple circuits for forming Si and Su. Because of the direct connection to ground, these circuits can be readily protected. They can be proportioned so accurately that angle errors at low frequencies and offset errors at high frequencies remain sufficiently small. Diodes which are advantageously connected antiparallel to the OP inputs are not shown.

In the comparator circuit 19 shown in FIG. 1, first an angle signal S'$\psi$ is formed as a square-wave signal having a pulse width proportional to the phase angle difference, its mean value S$\psi$ is present across the capacitor 20 and is evaluated, by the subsequent elements, as the criterion as to whether or not the motor 3 rotates at the operational speed.

Figure 3A:
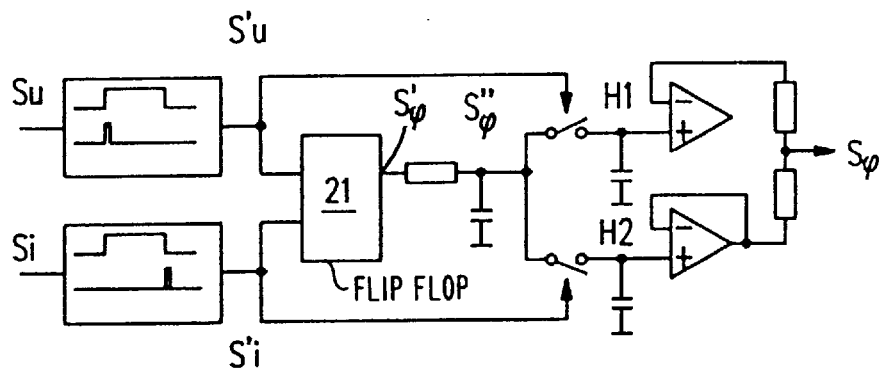
Figure 3B:
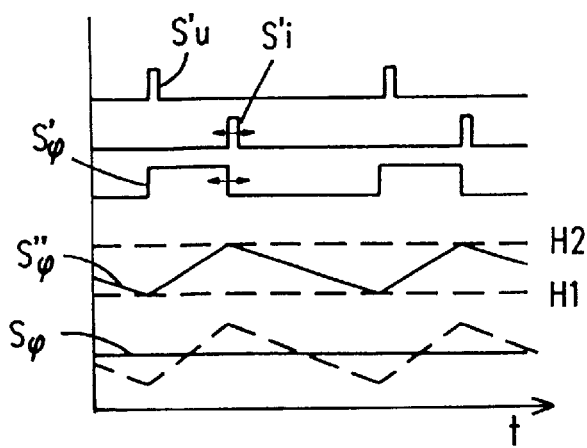

FIG. 3 shows an advantageous circuit for forming S$\psi$ from the signals Su and Si. It enables a phase angle measuring range of 360° instead of only 180° for the direct comparison of Su and Si. This is necessary for interruptions beyond the $\Delta \rightarrow Y$ transformer with a resultant ±60° angular shift in addition to the normal operating range (25° to 80°) and the response to the frequency decrease. From the edges of Su and Si there are first derived keying pulses S'u and S'i, respectively (FIG. 3b), which alternately drive the flip-flop 21 whose output signal S'$\psi$ forms a signal S"$\psi$ (FIG. 3b) via an RC combination. The RC combination cannot provide adequate smoothing, because it must respond very quickly to phase angle variations. Generally speaking, at low frequencies of the frequency changer 6 the ripple is even higher than the useful signal. Therefore, the keying pulses S'u and S'i drive two sample-and-hold circuits which form envelope curves $H_1$ and $H_2$. Downstream impedance transformers, comprising series-connected output resistors, form the smoothed angle signal S$\psi$.

The signal voltage S$\psi$ present across the capacitor 20 in conformity with FIG. 1 is also present across the capacitor 22 when the switch 23 is closed. During the keying operation for testing the rotation of the motor 3, the switch 23 is opened for a brief keying period T (see FIG. 4b). At the same time the control device 7 of the frequency changer 6 is triggered, by way of the command signal B, to decrease the frequency to preferably 50% of the operating frequency. As a result, the angle signal voltage S$\psi$ across the capacitor changes whereas the voltage S$\psi$0 across the capacitor 22 remains the same.

The thresholding circuit 24 supplies an output signal only if the difference S$\psi$–S$\psi$0 exceeds a minimum value M. If the current supplied by the current transformer 11 also exceeds a minimum value (because measurement of a phase angle makes sense only in those circumstances), a signal is applied to the rotation flip-flop 26 via the AND circuit 25, which flip-flop is set thereby so that an enable signal for activating the X-ray tube 2 is output via the output lead 27.

In order to test the rotation, a digital counter 27 supplies the keying period signal 28 for the frequency decrease; it is started by a start signal A from the start circuit 29. Via the OR circuit 30, the start signal A also resets the rotation flip-flop 26, so that no enable signal is issued via the lead 27 at the beginning of a keying operation.

In the case of keying operations which continuously succeed one another at regular intervals, resetting of the rotation flip-flop 26 is initiated by the timing block 31. In order to ensure that the enabling of the operation of the X-ray tube is not interrupted during the brief keying periods there is provided a rotation memory circuit 32 which stores the enable signal at least for the duration of the keying period.

Figure 4A:
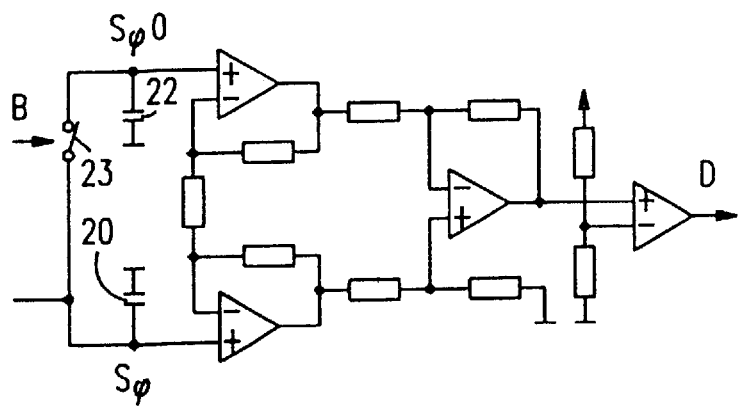
Figure 4B:
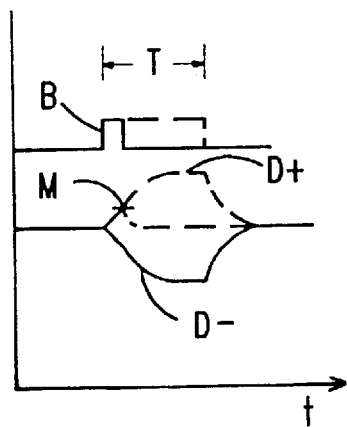

FIG. 4 shows an advantageous embodiment of the circuit 24 of FIG. 1. When the switch 23 is open, i.e. upon adjustment of the keying frequency, the voltage S$\psi$ increases with respect to S$\psi$ in the case of rotation of the motor. The downstream instrument amplifier generates a ground-related signal which is proportional to the difference S$\psi$–S$\psi$0 and whose amplitude is sufficiently high. Subsequently, a comparison with the reference voltage is performed in order to decide whether the positive difference signal D+ is larger than the reference signal M, and hence the enable command for the X-ray tube can be issued. As soon as the value M is exceeded, the keying operation can be interrupted and hence the keying period T reduced (via the lead 33 in FIG. 1).

If the motor does not start, a negative difference signal D– (FIG. 4b) will be measured; this signal cannot set the rotation flip-flop to the enable state.

I claim:

1. An X-ray apparatus, comprising a rotary-anode X-ray tube, and a control unit for supplying currents to a rotary-anode drive motor of the X-ray tube, said control unit comprising a device for monitoring the rotational speed of the rotary-anode drive motor, a sensor circuit for determining an angle signal which is dependent on a phase angle between a reference voltage and a current associated with the motor, a comparator circuit for detecting the angle signal variation which serves as a criterion for the rotational speed of the motor, and also comprising a frequency changer characterized in that there is provided a device for producing a keying signal during a brief keying period for triggering a reduction of the frequency of the current supplied to the rotary anode drive motor during the keying period from an operating frequency to a keying frequency, in order to determine from the resultant angle signal whether the motor was rotating at a predetermined operating rotational speed prior to the beginning of the keying signal.

2. An arrangement as claimed in claim 1, characterized in that there are provided means for storing the angle signal determined at the operating frequency prior to the beginning of the keying signal, as well as means for comparing said angle signal with an angle signal determined at the keying frequency during the keying period.

3. An arrangement as claimed in claim 1, characterized in that the keying frequency amounts from 25% to 75%, of the operating frequency.

4. An arrangement as claimed in claim 1, characterized in that the phase position of the reference voltage is chosen so that the angle signal which can be measured at the operating frequency and at the operating rotational speed corresponds to an angle of from 25° to 80°.

5. An arrangement as claimed in claim 1, characterized in that there are provided means for carrying out measuring operations at regular intervals.

6. An arrangement as claimed in claim 1, characterized in that there are provided means for inhibiting the activation of the X-ray tube when the detected rotational speed of the motor, is too low.

7. An arrangement as claimed in claim 1, characterized in that it comprises circuits for forming square-wave signals (Si, Su), the phase position of one square-wave signal (Su) being dependent on the reference voltage whereas that of the other square-wave signal (Si) is dependent on a current associated with the motor, that there are also provided circuits for forming keying pulses (S'u, S'i) on the one hand from the positive-going edge of the voltage-dependent signal (Su) and on the other hand from the negative-going edge of the current-dependent signal (Si), and that there is provided a circuit for forming a signal which is proportional to the time interval of the keying pulses.

8. An arrangement as claimed in claim 2, characterized in that there are provided means for inhibiting the activation of the X-ray tube when the detected rotational speed of the motor, is too low.

9. An arrangement as claimed in claim 2, characterized in that the keying frequency amounts from 25% to 75% of the operating frequency.

10. An arrangement as claimed in claim 2, characterized in that the phase position of the reference voltage is chosen so that the angle signal which can be measured at the operating frequency and at the operating rotational speed corresponds to an angle of from 25° to 80°.

11. An arrangement as claimed in claim 3, characterized in that the phase position of the reference voltage is chosen so that the angle signal which can be measured at the operating frequency and at the operating rotational speed corresponds to an angle of from 25° to 80°.

12. An arrangement as claimed in claim 9, characterized in that the phase position of the reference voltage is chosen so that the angle signal which can be measured at the operating frequency and at the operating rotational speed corresponds to an angle of from 25° to 80°.

13. An arrangement as claimed in claim 2, characterized in that there are provided means for carrying out measuring operations at regular intervals.

14. An arrangement as claimed in claim 3, characterized in that there are provided means for carrying out measuring operations at regular intervals.

15. An arrangement as claimed in claim 4, characterized in that there are provided means for carrying out measuring operations at regular intervals.

16. An arrangement as claimed in claim 12, characterized, in that there are provided means for carrying out measuring operations at regular intervals.

17. An arrangement as claimed in claim 3, characterized in that there are provided means for inhibiting the activation of the X-ray tube when the detected rotational speed of the motor, is too low.

18. An arrangement as claimed in claim 4, characterized in that there are provided means for inhibiting the activation of the X-ray tube when the detected rotational speed of the motor, is too low.

19. An arrangement as claimed in claim 1, characterized in that the keying frequency amounts from 40% to 60%, of the operating frequency.

20. An X-ray generator, comprising a control unit for supplying currents to a rotary-anode drive motor of an X-ray tube, said control unit comprising a device for monitoring the rotational speed of the rotary-anode drive motor, a sensor circuit for determining an angle signal which is dependent on a phase angle between a reference voltage and a current associated with the motor, a comparator circuit for detecting the angle signal variation which serves as a criterion for the rotational speed of the motor, and also comprising a frequency changer characterized in that there is provided a device for producing a keying signal during a brief keying period for triggering a reduction of the frequency of the current supplied to the rotary anode drive motor during the keying period from an operating frequency to a keying frequency, in order to determine from the resultant angle signal whether the motor was rotating at a predetermined operating rotational speed prior to the beginning of the keying signal.

* * * * *